United States Patent Office 3,437,730
Patented Apr. 8, 1969

3,437,730
METHOD OF COMBATING INSECTS WITH MONOCHLOROMETHYL THIOCYANATE
Horst Werres, Berlin, Dietrich Baumert, Kirchheim, and Clemens Kotter, Berlin, Germany, assignors to Schering, A.G., Berlin, Germany
No Drawing. Continuation-in-part of application Ser. No. 361,579, Apr. 21, 1964. This application Dec. 7, 1964, Ser. No. 416,615
Claims priority, application Germany, May 4, 1963, Sch 33,232
Int. Cl. A01m 9/12
U.S. Cl. 424—302                1 Claim

ABSTRACT OF THE DISCLOSURE

Monochloromethyl thiocyanate is used as a pesticide which term is used herein in a dictionary or generic sense to mean: killing of destructive or noxious living organisms including fungi, nematodes, bacteria and wood dwelling insects.

---

This application is a continuation-in-part of our copending application Ser. No. 361,579, filed Apr. 21, 1964, now abandoned.

This invention relates to pesticides, and more particularly to pesticidal compositions containing chloromethyl thiocyanate, and to methods of using such compositions.

Certain esters of thiocyanic esters are known to have biocidal properties. Trichloromethyl thiocyanate is known to have fungicidal, nematocidal, bactericidal and herbicidal effects (German Patent No. 956,549). In this connection, other esters of thiocyanic acid have been proposed for use as pesticides.

Whereas a high halogen content is normally expected to enhance the pesticidal activity of a compound, we have found that monochloromethyl thiocyanate is superior in many respects to the known trichloromethyl thiocyanate. This superiority is greatest in effect against nematodes and bacteria.

Compositions containing monochloromethyl thiocyanate as the active agent are potent fungicides. They may be employed to suppress the growth of a wide variety of undesirable or unwanted fungi. As a seed disinfectant, chloromethyl thiocyanate is superior even to the known mercurial disinfectants. Because of its excellent broad-spectrum bactericidal properties and its nematocidal effects, chloromethyl thiocyanate may be effectively employed as a soil disinfectant. Also, it is generally useful in the prevention and treatment of plant diseases caused by parasites.

Monochloromethyl thiocyanate is particularly effective in protecting wood against parasites and decay. The compound controls or destroys fungi that grow on wood, it kills wood-dwelling insects such as termites and the larvae of the old house borer, a powder post bettle.

The active agent of the invention may be combined with adjuvants, synergists and inert ingredients in the manner known in pest control work. The compositions may be powders, dusts, granulates, solutions, and emulsions, and may include solid or liquid inert carriers, and surface active agents for distributing the active agent in the carrier, and for imparting desired adherence to the composition.

Suitable liquid carriers include organic solvents such as xylene and methylene chloride. With reference to solid carriers, silicates such as talcum powder and Tonsil are preferred. Surface active agents which have been found useful as emulsifiers or wetting agents include alkylaryl-polyglycol ethers, alkylarylsulfonates, and fatty acid polyglycol esters, also salts of N-oleyl-N-methyltaurylsulfonic acid, and mixtures of such surface active agents.

Furthermore, chloromethyl thiocyanate is compatible with many other pesticides and crop protecting agents, and may be compounded jointly with such other active ingredients.

Chloromethyl thiocyanate is readily prepared by the reaction of chlorobromomethane with potassium thiocyanate in a known manner. Conventional mixing methods may be employed in compounding the active agent of the invention with carriers and adjuvants. The concentration of the active agent in the compositions may vary so widely depending on specific circumstances that meaningful general limits are not readily set.

The following examples are further illustrative of this invention, but it will be appreciated that the invention is not limited thereto.

Example 1

The fungicidal effects of monochloromethyl thiocyanate were determined by the Z-test method of K. H. Domsch (Nachrichtenblatt des deutschen Pflanzenschutzdienstes 10, 152 (1958)).

Mycel-slices (10 mm. in diameter) of the test-fungi were deposited in Petri dishes on a peat-sand mixture and treated with a 20% solution of chloromethyl thiocyanate in xylene otherwise containing emulsifiers and emulsified in water. The slices were stored for 24 hours while the temperature was held at 20° C. Subsequently they were deposited on a sterilized culture medium and incubated for another two to ten days. In these tests, the threshold concentration of the active agent which prevents growth of the tested fungus was evaluated.

The results obtained with several pathogenic fungi are shown in Table I.

TABLE I

| Fungus: | Threshold concentration toxic to the fungus, p.p.m. Cl—$CH_2$—SCN |
|---|---|
| Pythium ultimum | $\leq 10$ |
| Rhizoctonia solani | $\leq 10$ |
| Sclerotinia sclerotiorum (Mycel) | $\leq 10$ |
| Fus. oxysporum f. dianthi | $\leq 10$ |
| Fus. solani f. pisi | $\leq 10$ |
| Thielaviopsis basicola | $\leq 10$ |
| Phialophora cinerescens | $\leq 10$ |
| Fusarium culmorum | $\leq 10$ |

Example 2

Chloromethyl thiocyanate was dissolved to a concentration of 20 percent by weight in 75 parts of xylene, and 5 parts of an emulsifier mixture consisting of alkylaryl-polyglycol ethers, alkylaryl-sulfonates, and fatty acid polyglycol esters. The solution obtained was emulsified in water to make various concentrations of the fungicidal agent in the emulsions.

The emulsions were poured on soil artificially infected with *Pythium ultimum*, and the soil was seeded with peas. After three weeks, the percentage of germinated peas was determined in each test group.

Complete germination of all seeded peas was obtained with concentrations of 20 milligrams chloromethyl thiocyanate per kilogram earth or more.

Example 3

Culture media were prepared from 2% malt extract and 1.5% agar-agar powder and various amounts of chloromethyl thiocyanate, trichloromethyl thiocyanate, Captan (N - trichloromethylthio-4-cyclohexene-1,2-dicarboximide), and Thiram [bis (dimethylthiocarbamoyl) disulfide]. The fungicidal agent was uniformly distributed in the culture medium, which was then poured into a Petri dish and permitted to gel.

Each gelled medium was inoculated either with a small amount of a spore suspension held in a platinum wire loop or with a piece of agar, 5 mm. in diameter, taken from a Petri dish containing a fungus culture. Three to five days after inoculation, the diameter of the fungus culture was measured.

The results of the tests made are listed in Table III. The results show the diameter (in millimeters) of the fungus growth. The four fungi listed first were inoculated by means of spores and three fungi listed last by means of mycelium.

TABLE III

| Active agent, p.p.m. | Diameter of fungus growth in millimeters | | | |
|---|---|---|---|---|
| | Chloro-methyl-Thiocy-anate | Trichloro-methyl Thiocy-anate | Captan | Thiram |
| Aspergillus niger 100 | 0 | 0 | 0 | 0 |
| 10 | 0 | 75 | 43 | 15 |
| 1 | 0 | 80 | 66 | 58 |
| Colletotr. glocosp 100 | 0 | 0 | 0 | 0 |
| 10 | 0 | 35 | 40 | 0 |
| 1 | 0 | 80 | 0 | 0 |
| Fusarium solani 100 | 0 | 0 | 0 | 0 |
| 10 | 0 | 0 | 43 | 43 |
| 1 | 0 | 75 | 78 | 72 |
| Stemphyl. consort 100 | 0 | 0 | 0 | 0 |
| 10 | 0 | 0 | 44 | 0 |
| 1 | 0 | 70 | 60 | 36 |
| Botrytis cinerea 100 | 0 | 0 | 0 | 0 |
| 10 | 0 | 0 | 13 | 33 |
| 1 | 5 | 75 | 60 | 85 |
| Pythium ultimum 100 | 0 | 0 | 0 | 0 |
| 10 | 0 | 0 | 3 | 25 |
| 1 | 0 | 36 | 90 | 80 |
| Rhizoct. solani 100 | 0 | 0 | 0 | 0 |
| 10 | 0 | 0 | 0 | 15 |
| 1 | 0 | 100 | 50 | 35 |

Monochloromethyl thiocyanate is not only superior to trichloromethyl thiocyanate but also to the well known commercially employed fungicides Captan and Thiram.

Example 4

Rye seeds naturally infected with *Fusarium nivale* were treated with varying amounts of chloromethyl thiocyannate. Comparison tests were made with methoxyethyl-mercury silicate (6.9% in a commercial dry disinfectant preparation but not containing other ingredients toxic to fungi). Seeds of a control sample remained untreated.

The chloromethyl thiocyanate was dissolved in 75 parts xylene and 5 parts of an emulsifier. The xylene solution was then dispersed in one liter water, and the dispersion was shaken ten minutes with 100 kilograms of the seed material.

Treated and untreated samples were held in closed containers in the laboratory for one day. They were then incubated on sterile oat meal-dextrose-agar media for three days at 24° C. whereupon the sizes of the cultures formed were evaluated, the untreated seed material being used as a standard (100%). The results obtained are listed in Table IV.

TABLE IV

| Grams active agent per 100 kg. seeds | Fungus growth on rye seeds in percent of growth on untreated control sample | |
|---|---|---|
| | Active agent | |
| | Chloromethyl thiocyanate | Mercurial disinfectant |
| 13.8 | | 24 |
| 12.5 | 0 | |
| 6.9 | | 35 |
| 6.25 | 0.6 | |
| 3.45 | | 45 |
| 3.125 | 8 | |

Example 5

Wheat seeds were infected with smut by shaking one kilogram of seeds five minutes with 3 grams of spores of Tilletia caries. Samples of the infected seeds were then treated with a commercial mercurial disinfectant and with chloromethyl thiocyanate in the manner described in Example 4. The treated seeds were pushed, beard first, into levigated loam, and were kept in a refrigerated area at 13° C. After three days, 50% of the grains were removed. After three more days, the remaining grains were removed. Three additional days later, the average germination of the smut spores that had been left in the recesses of the loam was evaluated. An untreated control sample was used as a standard. The results obtained are listed in Table V.

TABLE V

| Grams active agent per 100 kg. seeds | Germination of Tilletia in loam at 13°C. in percent of untreated control sample | |
|---|---|---|
| | Active agent | |
| | Chloromethyl thiocyanate | Mercurial disinfectant |
| 5.52 | | 6 |
| 5.0 | 0 | |
| 2.76 | | 25 |
| 2.5 | 0 | |

Example 6

Oat seeds naturally infected with *Ustilago avenae* were additionally infected according to the wet vacuum method of Purdy (Plant Dis. Reptr. 42, 233–237, 1958). Various amounts of chloromethyl thiocyanate, trichloromethyl thiocyanate, and of a commercial dry disinfectant composition containing 6% active methoxyethyl-mercury-silicate were admixed to the seeds, and stored five days in closed containers. The seeds were then planted in the field, and the percentage of smut infected panicles was determined. Untreated seeds, not additionally infected, produced 4.5% infected panicles. Untreated seeds that had been subjected to the wet vacuum infection method produced 26.3%.

The results obtained are listed in Table VI below. Chloromethyl thiocyanate was admixed in these tests to the infected seeds either as a solution containing 2% of the active agent, 95% xylene and 3% of alkylarylpolyglycol-ethers, alkylarylsulfonates, and fatty acid polyglycol esters emulsified in water (a), or as a powder composition containing 1% of the active agent, 49.5% talcum powder and 49.5 Tonsil (b). Trichloromethyl thiocyanate was applied as a 20% solution in xylene otherwise containing emulsifiers and emulsified in water. The mercurial disinfectant was applied as commercially supplied in a dry powder composition.

TABLE VI

| Grams active agent per 100 kg. seeds | Smut infected panicles after treatment, percent | | | |
|---|---|---|---|---|
| | Active agent | | | |
| | Chloromethyl thiocyanate | | Trichloro-methyl thiocyanate | Mercurial disinfectant |
| | (a) | (b) | | |
| 240 | | | 3.3 | |
| 120 | | | 5.1 | |
| 60 | | | 11.6 | |
| 18 | | | | 12.8 |
| 15 | 0.3 | 0.9 | | |
| 13.5 | | | | 18.6 |
| 9 | | | | 21.3 |
| 8 | 1.0 | 0.9 | | |
| 4 | 1.6 | 1.8 | | |

Example 7

Larvae of the nematodes *Aphelenchoides ritzemabosi* and *Meloidogyne incognita* var. *acrita* were freshly recovered from infested plants and from a nutrient substrate respectively, and were placed in 2 milliliters of aqueous emulsions of chloromethyl thiocyanate prepared from a 20 percent solution of the active agent in 75 parts of xylene otherwise containing 5 parts of an emulsifier mixture consisting of alkylarylpolyglycolethers, alkyl-arylsulfonates, and fatty acid polyglycol esters. The concentration of the active agent in the emulsions ranged from 0.1 percent to 0.001% with intermediate values of 0.05, 0.01, and 0.005 percent. In all concentrations tested, chloromethyl thiocyanate killed 100 percent of the larvae of both nematode species within 24 hours.

Example 8

*Pectobacterium parthenii* (Starr) Helmmers var. *dianthiocola* Hellmers causes a bacteriose carnations. The microorganism was transplanted from a stock culture to a liquid bouillon culture medium, and cultured for eight days. One milliliter batches of the nutrient liquid containing the microorganisms were added to respective 90 milliliter batches of sterilized water in Erlenmeyer flasks. Aqueous emulsions containing chloromethyl thiocyanate and trichloromethyl thiocyanate in various concentrations were prepared from 20% solutions of the active agents in xylene otherwise containing 5 parts of the above described emulsifiers. Nine milliliters of each concentration were added to the aqueous suspensions of bacteria in the Erlenmeyer flasks.

Four days later, specimens from the contents of each flask were inoculated by means of a wire loop on nutrient media prepared according to Dowson, W. J. (Nature 179, 682 (1957)). Three inocula from the same flask were deposited in each Petri dish. The pectolytic activity of the microorganisms was evaluated after four days.

The amounts of chloromethyl thiocyanate and trichloromethyl thiocyanate added to the aqueous media in the Erlenmeyer flasks were such as to make the concentrations of the active agents 0.1, 1.0, 10 and 100 parts per million. The pectolytic activity of the microorganisms was suppressed after treatment with at least 1 p.p.m. monochloromethyl thiocyanate. At least 10 p.p.m. trichloromethyl thiocyanate were required to produce the same effect.

Example 9

Young plants of *Cucurbita pepo* var. *giromontiina* each having two adult leaves were sprayed with an aqueous emulsion containing 0.16 percent of chloromethyl thiocyanate. Subsequently the moistened upper surfaces of the leaves were dusted with an amount of approximately 7,400 balls of conidia of *Erysiphe cichoriacearum* per square inch. After 5 days the percent of mycelium grown on the inoculated leaves was determined. Treated leaves showed about 93 percent control of the fungus whereas on untreated leaves the fungus developed abundantly.

Example 10

According to the German Standard DIN 52 176 identical small blocks of pine (*Pinus sylvestris* L.) sapwood, 5 cm. x 2.5 cm. x 1.5 cm. were treated to saturation with chloroform solutions of monochloromethyl thiocyanate of various concentrations. During a 4 weeks storage of too fast evaporation of the solvent was prevented.

A treated block and an untreated control sample were then placed on mono cultures of wood-destroying fungi in a Kolle flask (a flat glass vessel having a lateral aperture). The wood blocks were left in contact with the fungus cultures at 20° C. for three months, *Lenzites abietana* for four months.

The blocks were then removed from the fungus cultures and the damage caused by the fungi was evaluated by visual inspection and by determination of weight loss. The concentrations of active agent in the several blocks exposed to the same fungus were relatively widely spread so that the limit of protection could not always be precisely determined. Where two values of retention of monochloromethyl thiocyanate appear in the following Table VII, the higher figure indicates the minimum retention which prevented visible and measurable decay of the treated wood block, while the lower figure indicates the next lower concentration not preventing attack of the wood. The retentions are listed in kg. of active agent per cubic meter of wood, and the concentration of the treating solution used is also indicated. The highest of the threshold against the fungi tested is considered to be the significant one.

TABLE VII

| Fungus tested | Concentration of treating solution, percent | | Kg. active agent per m.³ wood | |
|---|---|---|---|---|
| Coniophora cerebella | 0.03 | 0.1 | 0.26 | 0.91 |
| Poria vaporaria | 0.03 | 0.1 | 0.26 | 0.91 |
| Poria monticola | 0.03 | 0.1 | 0.26 | 0.91 |
| Merulius lacrimans | 0.01 | 0.03 | 0.081 | 0.26 |
| Lenzites trabea | 0.03 | 0.1 | 0.26 | 0.85 |
| Lentinus lepideus | <0.01 | | <0.081 | |
| Lenzites abietina | <0.01 | | <0.081 | |

Example 11

Pine wood blocks prepared as described in Example 10 and kept for 4 to 5 weeks at 20° C. were provided with ten small holes, and a freshly hatched larva of the Old House Borer, *Hylotrupes bajulus* L., was placed in each hole. The blocks containing the larvae were kept at 20±0.5° C. at a relative humidity of 75%. Some blocks were opened after 4 weeks, others after 12 weeks for inspection of the larvae.

The condition of the larvae was classified as follows:

(a) Dead without visible quavering;
(b) Dead after quavering;
(c) Alive and active.

Control tests were made with untreated pine sapwood blocks. The results obtained are listed in the following table.

TABLE VIII

| Weeks of contact | Conc. of treating sol'n, percent | Kg. active agent per m.³ wood | Percentage of larvae in condition | | |
|---|---|---|---|---|---|
| | | | (a) | (b) | (c) |
| 4 weeks | 1.0 | 8.4 | 100 | 0 | 0 |
| | 0.40 | 3.3 | 100 | 0 | 0 |
| | 0.20 | 1.7 | 100 | 0 | 0 |
| | 0.10 | 0.83 | 100 | 0 | 0 |
| | 0.063 | 0.40 | 100 | 0 | 0 |
| | 0.040 | 0.34–0.25 | 80 | 0 | *20 |
| | 0.025 | 0.16 | 50 | 0 | 50(*20) |
| 12 weeks | 0.063 | 0.41 | 100 | 0 | 0 |
| | 0.040 | 0.26 | 100 | 0 | 0 |
| | 0.026 | 0.16 | 30 | 70 | 0 |
| | 0.016 | 0.10 | 0 | 100 | 0 |
| | 0.010 | 0.067 | 0 | 90 | 10 |
| Untreated control | | | 0 | 5 | 95 |

*Almost dead, no enlargement of original hole.

All test larvae were killed within four weeks by contact with wood blocks containing 0.3 kg. of the active agent per m.³ wood, respectively treated with a 0.040% chloroform solution. A few remained alive at 0.2 kg. per m.³, respectively 0.025% solution.

After 12 weeks contact of the test larvae with the treated wood, all animals were killed at 0.1 kg. per m.³ (treatment with a 0.016% solution), and a few were alive at 0.07 kg. per m.³ (0.010% solution).

Example 12

Sapwood blocks from pine (*Pinus sylvestris* L. of the dimensions indicated above were treated with monochloromethyl thiocyanate and kept in the way described above.

The blocks thereafter were exposed to current air in a wind tunnel at an air velocity of 1 meter per second and at a temperature cycle of 8 hours at 20° C. and 16 hours at 40° C. for four weeks.

Test blocks treated with solutions containing 1% and 0.1% of the active agent of the invention and untreated control blocks were exposed to four species of termites.

A laboratory culture of Kalotermes flavicollis Fabr. was derived from animals imported from Southern Italy in 1953.

A second laboratory termite was Reticulitermes lucifugus Rossi var. santonensis de Feytaud descending from specimens brought from La Rochelle in Southwestern France in 1958.

The third species was the Indian termite Heterotermes indicola Wasmann, brought from Kanpur U.P. in 1957.

The fourth species was Nasutitermes ephratas a tropical termite too brought from Mexico in 1959.

The tests with Kalotermes flaviocollis were performed by the method described in Wiss. Abh. Dtsch. Materialprüfungsanstalten (Scientific Papers from the German Institute for Testing Materials) II/3 (1942), pages 40 to 66, and II/7 (1950), pages 62 to 70, in this test method, the animals are placed on the tested samples and thus deprived of all other food. The tests were performed at 26° C. at 90% R.H. The condition of the animals was observed daily (only on weekdays).

The tests with the three other termite species were performed by a method similar to an Australian standard method. Glass jars, 9 cm. in diameter and 12 cm. high, were filled approximately ⅓ with heated, moist humus-containing soil. A piece of wood taken from the original termite colony was placed on the bottom of the jar. The block to be tested was placed on the surface of the soil, and the jar was covered with a perforated lid.

Groups of weighed termites were placed in each jar. The individuals of the groups were selected for uniform distribution of all development stages. The jars were kept in an air conditioned room at 26° C. and 90% R.H. The animals were inspected daily (only on weekdays) during the early stages of each test, later three times a week. The tests were finished after eight weeks.

About 200 termites of Reticulitermes lucifugus made up one group which consisted of workers, nymphs, and soldiers. The groups of Heterotermes indicola included 500 termites containing workers, nymphs, soldiers, and neotenic sexual types. The 500 individuals of Nasutitermes ephratas consisted of workers and soldiers only.

The results obtained in the test with Kalotermes flavicollis are listed in the following table:

TABLE IX

| Conc'n of treating sol'n, percent | Kg. active agent per m.³ wood | Live span of animals | | | Note |
|---|---|---|---|---|---|
| | | Min. | Mean | Max. | |
| 1 | 7.8 | 2 | 2.3 | 3 | No visible attack on wood. |
| 1 | 7.8 | 2 | 2.6 | 5 | Do. |
| 0.1 | 0.76 | 5 | 10 | 28 | Do. |
| 0.1 | 0.76 | 5 | 20 | 61 | Significant attack. |
| Untreated control. | | | | >61 | Destructive attack 40% of animals survive. |

In the tests with Rectulitermes lucifugus the blocks impregnated with 8.3 kg. monochloromethyl thiocyanate per m.³ repelled the termites which were dead after 7 days. The wood was undamaged. The blocks treated with 0.76 kg./m.³ were at first avoided by the termites but these later built galleries on the two sections. After eight weeks, 41% of the animals were dead, and there was visible attack in one area on the underside of the block. The untreated control blocks were severely damaged when inspected after eight weeks. Galleries had been built on the blocks and on the wall of the jar. 22 percent of the termites were dead.

Heterotermes indicola reacted as described in the preceding paragraph to the blocks containing 8.4 kg. of the active agent per m.³. Blocks containing only 0.78 kg./m.³ also were avoided by the termites, all of whom were dead after 11 days. The untreated control blocks were heavily attacked when inspected after eight weeks, and only 19% of the animals were dead.

Nasutitermes ephratae was repelled by 7.8 kg./m.³ of the monochloromethyl thiocyanate in the blocks. The termites were dead within 16 hours without having attacked the wood. The same result was obtained with blocks containing only 0.76 kg./m.³ of the active agent. The untreated controls were moderately attacked on the underside, the termites lived for eleven days.

These results show that monochloromethyl thiocyanate is not only toxic to termites of widely differing origin and habits, but that it also repels the animals. An impregnation of wood with 7 to 8 kg. per cubic meter prevented attack in all instances, and one tenth of this concentration was sufficient to prevent all attack by two species tested, and to substantially mitigate attack by two others.

From the foregoing, it is to be noted that monochloromethyl thiocyanate is an effective fungicide; that it is also useful in destroying nematodes and bacteria which infect plants, and that it protects woods against parasites. It is superior in equal amounts to trichlormehtyl thiocyanate in protecting plant material, and is capable of pesticidal action not available from trichloromethyl thiocyanate in any concentration under otherwise comparable conditions. Monochloromethyl thiocyanate is superior as a fungicide for the protection of cereal seeds, to the mercurial products heretofore most widely employed for the same purpose. It is also more effective than such well known fungicides as Captan and Thiram in suppressing the growth of fungi in vitro. When admixed to soil to a concentration of 120 parts per million chloromethyl thiocyanate sharply reduces or prevents nematode damage to tomatoes.

We claim:
1. A method of combating wood dwelling insects which comprises contacting said insects with an effective amount of monochloromethyl thiocyanate.

References Cited

FOREIGN PATENTS 1,157,603  11/1963  Germany.

ALBERT T. MYERS, *Primary Examiner.*

J. GOLDBERG, *Assistant Examiner.*